United States Patent [19]
Griffin et al.

[11] Patent Number: 5,669,271
[45] Date of Patent: Sep. 23, 1997

[54] ELEMENTS FACED WITH SUPERHARD MATERIAL

[75] Inventors: Nigel Dennis Griffin, Whitminster; John Michael Fuller, Nailsworth, both of England

[73] Assignee: Camco Drilling Group Limited of Hycalog, Stonehouse, England

[21] Appl. No.: 569,333

[22] Filed: Dec. 8, 1995

[30] Foreign Application Priority Data

Dec. 10, 1994 [GB] United Kingdom ............ 9424968

[51] Int. Cl.$^6$ ........................................ B21K 5/04
[52] U.S. Cl. ................ 76/108.2; 76/108.1; 175/428
[58] Field of Search ............... 76/108.1, 108.2, 76/108.4, 101.1; 175/428

[56] References Cited

U.S. PATENT DOCUMENTS

| | | |
|---|---|---|
| 4,604,106 | 8/1986 | Hall et al. |
| 4,629,373 | 12/1986 | Hall ........................... 76/101.1 |
| 4,686,080 | 8/1987 | Hara et al. .................. 76/108.2 |
| 4,784,023 | 11/1988 | Dennis ........................ 76/108.2 |
| 5,011,515 | 4/1991 | Frushour . |
| 5,120,327 | 6/1992 | Dennis ........................ 76/108.2 |
| 5,355,969 | 10/1994 | Hardy et al. ................. 76/108.2 |
| 5,388,484 | 2/1995 | Bogner ........................ 76/108.2 |

FOREIGN PATENT DOCUMENTS

| | | |
|---|---|---|
| 2273306 | 6/1994 | United Kingdom . |
| 2283772 | 5/1995 | United Kingdom . |
| 2283773 | 5/1995 | United Kingdom . |
| 2290326 | 12/1995 | United Kingdom . |

*Primary Examiner*—Hwei-Siu Payer

[57] ABSTRACT

A preform cutting element for a drag-type rotary drill bit includes a facing table of polycrystalline diamond bonded to a less hard substrate, such as cemented tungsten carbide. The element is formed by first forming a solid substrate, and then applying an electron beam, laser, or other intense heating source to adjacent areas of the front surface of the substrate to melt the surface and form an array of holes or holes therein. A layer of polycrystalline diamond particles is applied to the substrate so that such particles fill the holes or holes, and the diamond layer and substrate are then subjected to pressure and temperature in a high pressure, high temperature press to bond the superhard layer to the substrate. The engagement of parts of the diamond table in the holes or holes in the substrate provides a mechanical interlock to improve the strength of the bond between the table and substrate.

7 Claims, 2 Drawing Sheets

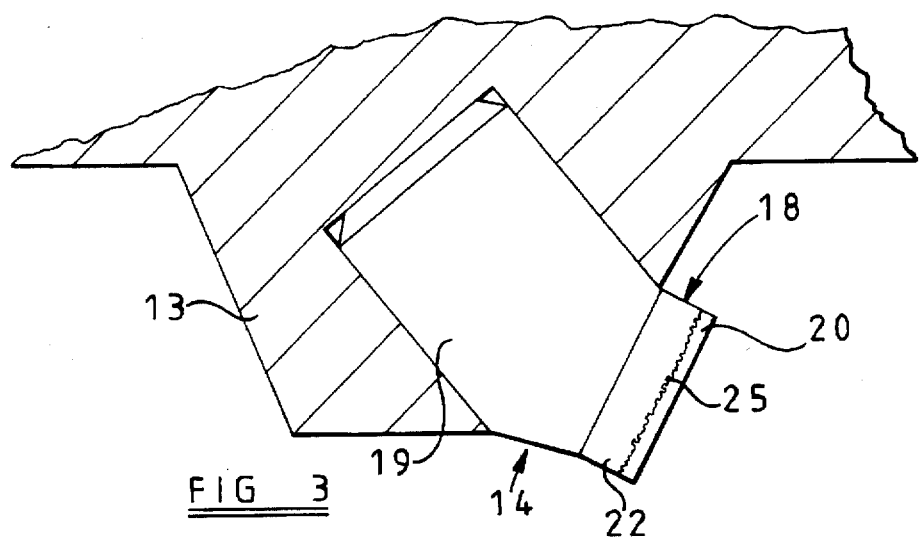
FIG 3
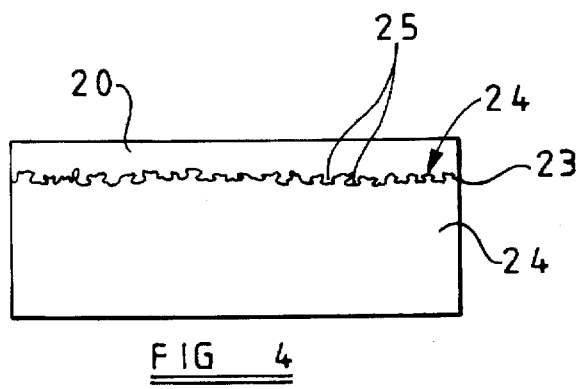
FIG 4
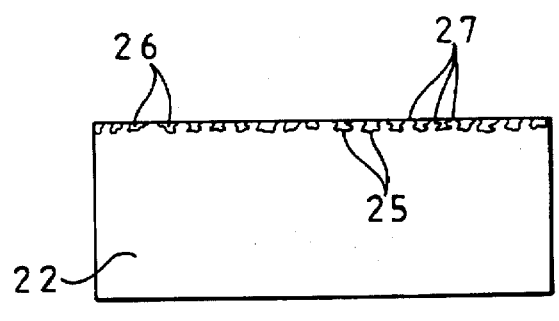
FIG 5
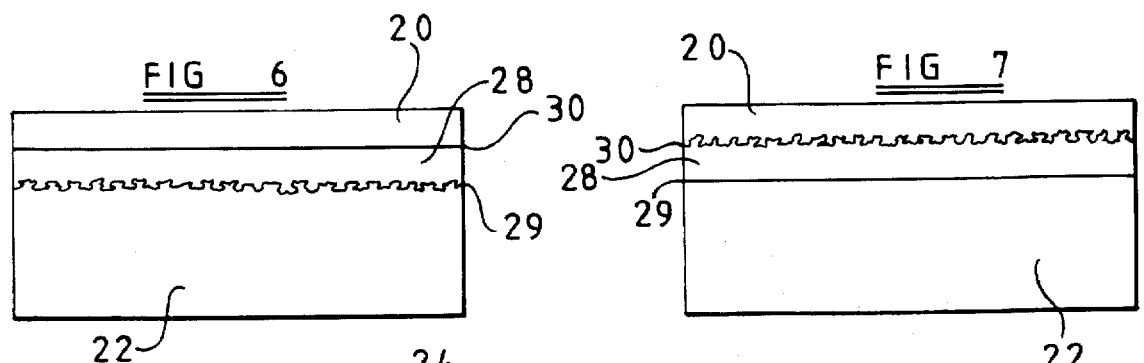
FIG 6
FIG 7
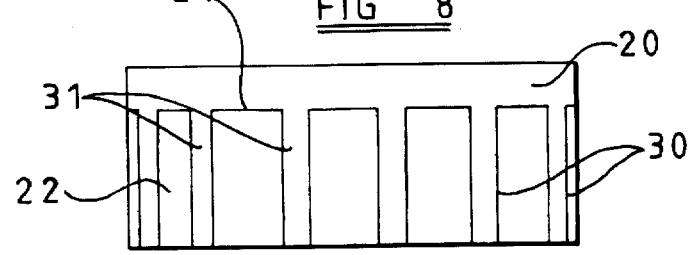
FIG 8

ELEMENTS FACED WITH SUPERHARD MATERIAL

BACKGROUND OF THE INVENTION

1. Field of the Invention

The invention relates to elements faced with superhard material, and more particularly to preform elements comprising a facing table of superhard material having a front face, a peripheral surface, and a rear surface bonded to a substrate of material which is less hard than the superhard material.

2. Description of Related Art

Preform elements of this kind are often used as cutting elements on rotary drag-type drill bits, and the present invention will be particularly described in relation to such use. However, the invention is not restricted to cutting elements for this particular use, and may relate to preform elements for other purposes. For example, elements faced with superhard material, of the kind referred to, may also be employed in workpiece-shaping tools, high pressure nozzles, wire-drawing dies, bearings and other parts subject to sliding wear, as well as elements subject to percussive loads as may be the case in tappets, cams, cam followers, and similar devices in which a surface of high wear resistance is required.

Preform elements used as cutting elements in rotary drill bits usually have a facing table of polycrystalline diamond, although other superhard materials are available, such as cubic boron nitride. The substrate of less hard material is often formed from cemented tungsten carbide, and the facing table and substrate are bonded together during formation of the element in a high pressure, high temperature forming press. This forming process is well known and will not be described in detail.

Each preform cutting element may be mounted on a carrier in the form of a generally cylindrical stud or post received in a socket in the body of the drill bit. The carrier is often formed from cemented tungsten carbide, the surface of the substrate being brazed to a surface on the carrier, for example by a process known as "LS bonding". Alternatively, the substrate itself may be of sufficient thickness as to provide, in effect, a cylindrical stud which is sufficiently long to be directly received in a socket in the bit body, without being brazed to a carrier. The bit body itself may be machined from metal, usually steel, or may be molded using a powder metallurgy process.

Such cutting elements are subjected to extremes of temperature during formation and mounting on the bit body, and are also subjected to high temperatures and heavy loads when the drill is in use down a borehole. It is found that as a result of such conditions spalling and delamination of the superhard facing table can occur, that is to say the separation and loss of the diamond or other superhard material over the cutting surface of the table. This may also occur in preform elements used for other purposes, and particularly where the elements are subjected to repetitive percussive loads, as in tappets and cam mechanisms.

Commonly, in preform elements of the above type the interface between the superhard table and the substrate has usually been flat and planar. However, particularly in cutting elements for drill bits, attempts have been made to improve the bond between the superhard facing table and the substrate by configuring the interface between the superhard layer and substrate.

One such arrangement is shown in U.S. Pat. No. 5,120,327 where the rear surface of the facing table is integrally formed with a plurality of identical spaced apart parallel ribs of constant depth. The facing table also includes a peripheral ring of greater thickness, the extremities of the parallel ribs intersecting the surrounding ring. U.S. Pat. No. 4,784,023 illustrates a similar arrangement but without the peripheral ring.

Further arrangements for configuring the interface between the superhard table and the substrate, or between such layers and a transition layer, are described and claimed in British Patent Applications Nos. 9422426.8 and 9422427.6 and British Specification No. 2273306.

SUMMARY OF THE INVENTION

According to one aspect of the invention there is provided a method of manufacturing a preform element including a facing table of superhard material having a front face and a rear surface bonded to the front surface of a substrate which is less hard than the superhard material, the method comprising forming a solid substrate, applying an electron beam, laser, or other intense heating source to adjacent areas of the front surface of the substrate to melt the surface and form an array of recesses or holes therein, applying to said front face a layer of superhard particles so that particles of superhard material fill said recesses or holes, and subjecting the superhard layer and substrate to pressure and temperature in a high pressure, high temperature press to bond the superhard layer to the substrate. The holes may extend through the entire thickness of the substrate, if required.

Preferably the recesses or holes are formed in the surface of the substrate by an electron beam texturing process. According to this process an electron beam is applied to the front surface of the substrate to form the required recesses or holes. The electron beam is an intense beam from a source of, for example, 5 kW, and is thus less powerful than electron beams used in conventional electron beam welding methods.

The electron beam first forms a hole in the surface of the substrate. As the hole is formed, the molten metal of the substrate in each hole comes to the surface. However, adjacent holes are formed simultaneously, or rapidly in succession, so that the molten metal from adjacent holes flows together before it is fully solidified. In the course of the subsequent solidification the interaction between the surface tension of the adjacent areas acts to deform the holes in the substrate which may provide a considerable number of undercuts, as viewed in cross-section, depending on the properties of the substrate metal. The superhard material extends into these recesses or holes in the finished element. If the recesses are undercut this has the effect of providing a mechanical interlock between the superhard table and substrate against relative movement transverse to said surfaces.

According to a second aspect of the invention, therefore, there is provided a preform element including a facing table of superhard material having a front face and a rear surface bonded to the front surface of a substrate which is less hard than the superhard material, said front surface of the substrate being formed with a plurality of recesses into which the superhard material extends, and at least some of said recesses being undercut whereby the facing table is mechanically interlocked with the substrate against relative movement transverse to said surfaces.

In the prior art arrangements the configured interface between the facing table and substrate increases the bonding area between the facing table and substrate and thus improves the bond. Also, the configured interface significantly improves the shear strength of the bond between the facing table and substrate. According to the second aspect of the present invention, however, the recesses in the substrate are undercut so as to provide mechanical interlocking between the facing table and substrate, somewhat in the manner of the interlocking between pieces of a jig-saw puzzle, and thus substantially increases the mechanical strength of the bond.

In both aspects of the invention the superhard table may be thicker than the depth of the recesses in the substrate so as to comprise a continuous layer extending continuously across the whole of the front face of the substrate, or a substantial portion thereof. Alternatively, the superhard table may have a thickness which is no greater than the depth of said recesses so that the superhard table comprises a plurality of separate unconnected areas, within said recesses, between which extend exposed portions of the front face of the substrate itself.

Said recesses may comprise an array of cavities extending across said front surface of the substrate. Said cavities may be of a irregular cross-section.

The invention also includes within its scope a method of manufacturing a preform element including a facing table of superhard material having a front face and a rear surface bonded to the front surface of a substrate which is less hard than the superhard material, the method comprising forming a solid substrate with a front face having a plurality of recesses, at least some of which are undercut, applying to said front face a layer of superhard particles so that particles of superhard material fill said recesses, and subjecting the superhard layer and substrate to pressure and temperature in a high pressure, high temperature press to bond the superhard layer to the substrate so that engagement of the superhard material within the undercut recesses provides a mechanical interlock between the superhard table and substrate.

The undercut recesses may be formed in the front face of the substrate by any convenient process, including machining or molding, or may be formed by the electron beam texturing process referred to above, if the properties of the substrate material are such that the flow of material during the process is such as to form such undercuts.

In some types of preform element a transition layer is provided between the facing table and substrate, the transition layer usually having certain critical properties, such as elastic modulus and/or coefficient of thermal expansion, intermediate the corresponding properties of the superhard layer and substrate. In such a type of preform, according to the present invention, the face of the transition layer which engages the rear face of the superhard layer may be textured by electron beam texturing or similar process, and/or formed with said undercut recesses. Alternatively or additionally, the front face of the substrate may be textured by electron beam texturing or similar process, and/or formed with said undercut recesses.

As previously mentioned, the preform element may, in use, be mounted on a carrier or other surface. The present invention therefore also provides a method of bonding a preform element to a carrier, or of brazing the carrier to a surface or within a socket, wherein at least one of the surfaces to be bonded or brazed together is textured by electron beam texturing or similar process.

BRIEF DESCRIPTION OF THE DRAWINGS

FIG. 3 is a side elevation of a typical cutter assembly incorporating a preform cutter element according to the invention.

FIGS. 4–8 are diagrammatic sections, on an enlarged scale, through various types of preform element according to the present invention.

DETAILED DESCRIPTION OF THE PREFERRED EMBODIMENTS

Figure 1:
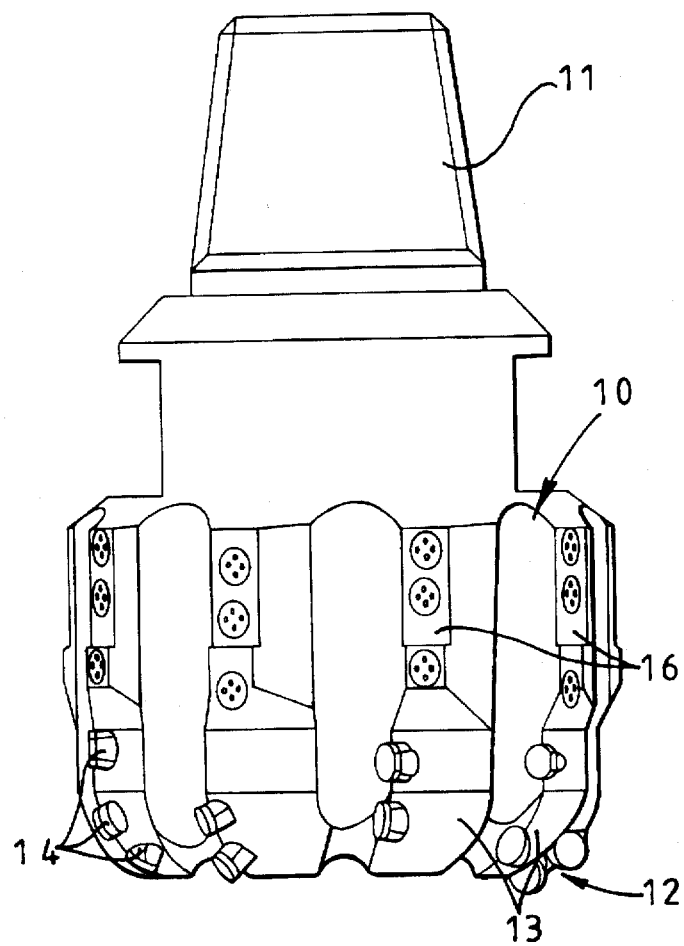
FIG. 1 is a side elevation of a drag-type drill bit in which the cutting elements comprise preform elements according to the present invention.
Figure 2:
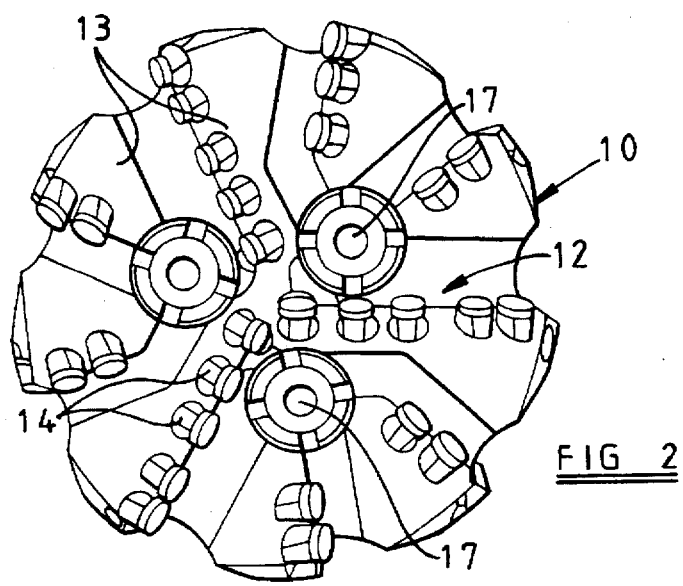
FIG. 2 is an end elevation of the drill bit shown in FIG. 1.

FIGS. 1 and 2 show a typical full bore drag bit of a kind to which preform cutting elements of the present invention are applicable. The bit body 10 is machined from steel and has a shank formed with an externally threaded tapered pin 11 at one end for connection to the drill string. The operative end face 12 of the bit body is formed with a number of blades 13 radiating from the central area of the bit, and the blades carry cutter assemblies 14 spaced apart along the length thereof. The bit has a gauge section including kickers 16 which contact the walls of the borehole to stabilize the bit in the borehole. A central passage (not shown) in the bit and shank delivers drilling fluid through nozzles 17 in the end face 12 in known manner.

As shown in greater detail in FIG. 3, each cutter assembly 14 comprises a preform cutting element 18 mounted on a carrier 19 in the form of a post which is located in a socket in the bit body. Each preform cutting element is in the form of a circular tablet comprising a facing table 20 of superhard material, usually polycrystalline diamond, bonded to a substrate 22, for example of cemented tungsten carbide. The rear surface of the substrate is bonded, for example by the process known as LS bonding, to a suitably orientated surface on the post 19.

For clarity, the thickness of the layers is exaggerated in FIG. 3, as well as in FIGS. 4–18. In the following description the superhard table will usually be referred to, for convenience, as a diamond layer, and the substrate will be referred to as comprising tungsten carbide. However, it will be appreciated that any other suitable superhard and hard materials may be used for these layers respectively.

In accordance with one aspect of the invention, the interface 23 between the diamond layer 20 and the substrate 22 of the cutting element of FIG. 3 is configured so as to improve the bond between the diamond layer and the substrate.

As may be seen from FIG. 3, the front surface 24 of the substrate 22 is formed with a plurality of irregular cavities or recesses 25, the size of the cavities being exaggerated in FIG. 3. The polycrystalline diamond material of the facing table 20 extends into these cavities.

The general methods of forming preform elements of this general kind are well known. Thus, a solid tungsten carbide substrate is initially preformed and a layer of polycrystalline diamond particles is then applied to the upper surface of the substrate and the whole assembly is then subjected to very high pressure and temperature in a press so that diamond-to-diamond bonding occurs between the diamond particles to form a solid superhard layer bonded to the substrate. Hitherto, the substrate has usually had a flat upper surface so as to provide a flat interface between the diamond layer and substrate, although as previously mentioned arrangements are known in which the upper surface of the substrate is shaped to provide a configured and non-planar interface.

The cutting element shown in FIG. 3 is formed by a similar method, but in this case the configuring of the upper surface of the substrate 22 is effected by the aforementioned process known as electron beam texturing which produces the cavities 25 in the upper surface of the substrate. When the layer of diamond particles is subsequently applied to the substrate 22, these cavities become filled with the diamond particles so as to form a solid interlocking structure after the element has been formed in the high temperature, high pressure press.

The cross-sectional shapes of the cavities 25 will depend on the properties of the metal from which the substrate is formed. In the case where the substrate is formed from tungsten carbide the cavities may not be undercut in view of the brittle nature of this metal. The cavities may, for example, be of inverted bell-shape. However, the metal of the substrate may be such that during the electron beam texturing process the flow of metal during the process causes the cavities to become undercut. In this case the polycrystalline diamond material of the facing table 20 will extend into the cavities, and beneath the undercuts, so that the diamond table is mechanically interlocked to the substrate against displacement transverse to the general plane of the interface. Such an arrangement is shown diagrammatically in FIG. 4.

In the arrangement of FIGS. 3 and 4, the thickness of the diamond layer 20 is greater than the depth of the recesses 25 so that a continuous layer of diamond is formed across the whole surface of the substrate 22. FIG. 5 shows an alternative arrangement where the thickness of the diamond layer is no greater than the depth of the recesses 25 so that the diamond layer comprises a plurality of separate areas 26 within the recesses 25, the areas of diamond being surrounded by exposed areas 27 of the surface of the substrate 22. The arrangement of FIG. 5 is particularly suitable for providing an abrasive surface on a grinding wheel or for rendering the internal diameter of such a wheel abrasion-resistant.

When an element of the kind shown in FIG. 5 is placed in the high temperature, high pressure press to bond the multi-part diamond layer to the substrate, re-melting of the substrate occurs, and this may cause parts of the surface of the substrate to partly close over the diamond regions so that they become partly embedded and mechanically locked into the surface of the substrate.

As previously mentioned, in some forms of preform cutting element it is known to provide a transition layer between the substrate and diamond layer. The transition layer usually has a coefficient of thermal expansion and/or an elastic modulus intermediate the corresponding properties of the diamond layer and substrate.

The method described with reference to FIG. 5 may therefore also be used to provide a transition layer on a substrate before the continuous diamond layer is bonded to it. That is to say, the preform element of FIG. 5, instead of being used as a preform cutting element in its own right, may be employed as the substrate of a cutting element, a further continuous layer of polycrystalline diamond being applied over the preformed substrate which includes the diamond areas 26. In this case the separate diamond regions 26 embedded in the top layer of the tungsten carbide substrate form a transition layer between the main tungsten carbide body of the substrate 22 and the continuous layer of polycrystalline diamond subsequently applied over the diamond areas 26. FIGS. 6 and 7 show other arrangements where a transition layer is provided.

In the arrangement of FIG. 6, the interface 29 between the transition layer 28 and the substrate 22 is formed with recesses, which may be undercut as shown, the upper surface of the substrate 22 being configured by electron beam texturing. The interface 30 between the transition layer 28 and the diamond layer 20 is flat or may be otherwise configured. In the arrangement of FIG. 7 the interface 29 between the transition layer 28 and substrate 22 is flat whereas it is the interface 30 between the transition layer 28 and the diamond layer 20 which is configured. In this case, the transition layer 28 comprises a solid preformed disc of suitable material, the upper surface of which is formed with recesses, which may be undercut, by electron beam texturing before it is assembled with the layer of diamond particles to form the facing table 20. Alternatively, both the interface 29 and 30 may be configured by electron beam texturing.

FIG. 8 shows an arrangement in which the power of the electron beam is sufficient to cause holes 30 to be formed through the entire thickness of the substrate 22 during the electron beam process. When the layer 20 of polycrystalline diamond particles is subsequently applied to the upper surface 24 of the substrate the holes 30 also become filled with diamond particles. Consequently, when the element has been treated in the high pressure, high temperature press the diamond forms rods 31 extending through the entire thickness of the substrate 22 from the diamond layer 20. These rods will serve to secure the diamond layer 20 very strongly to the substrate and resist delamination.

In all of the arrangements described above the surface of the substrate which is formed with holes or recesses by the electron beam processed is basically flat and planar. However, the invention does not exclude arrangements where the front surface of the substrate is non-planar or configured before the electron beam texturing process is carried out. Thus, the front surface of the substrate might be convexly or concavely curved or may be otherwise configured to provide a macro shaping onto which the finer configuration provided by the electron beam texturing is imposed.

FIG. 3 shows the cutting element 18 bonded to a stud 19 which is received in a socket in the bit body. According to another aspect of the present invention, the rear surface of the substrate 22 and/or the surface of the stud 19 on to which it is bonded, for example by LS bonding, is textured by electron beam texturing before the bonding process is carried out. Similarly, the brazing of the post 19 into the socket in the bit body may be enhanced by electron beam texturing the surface of the post and/or the surface of the socket, or parts thereof, prior to the brazing process. In each case the braze material, as brazing is effected, enters the recesses in the surfaces being brazed, and this provides an improved interlock between the brazed material and the surfaces so as to improve the strength of the bond.

As previously mentioned, instead of an electron beam, a laser or any other intense heating source may be employed to melt the surface of the substrate locally thereby to produce the required texture to that surface. In alternative arrangements where an undercut configuration is required the undercut surface may be formed by machining or moulding of the substrate.

By an "undercut" recess is meant any recess in a surface where any part of the recess below the surface extends beyond the periphery of the mouth of the recess in the surface, so as to underlie a part of said surface.

Whereas the present invention has been described in particular relation to the drawings attached hereto, it should be understood that other and further modifications, apart from those shown or suggested herein, may be made within the scope and spirit of the present invention.

What is claimed is:

1. A method of manufacturing a preform element including a facing table of superhard material having a front face and a rear surface bonded to the front surface of a substrate which is less hard than the superhard material, the method comprising forming a solid substrate, applying an intense heating source to adjacent areas of the front surface of the substrate to melt the surface of the substrate in each of said area so as to form in each area a pool of molten substrate material and thereby to create, on subsequent cooling and solidification of the molten material, a cavity in the surface of the substrate in each said area, applying to said front face a layer of superhard particles so that particles of superhard material fill said cavities, and subjecting the superhard layer and substrate to pressure and temperature in a high pressure, high temperature press to bond the superhard layer of the substrate.

2. A method according to claim 1, wherein the cavities extend through the entire thickness of the substrate.

3. A method according to claim 1, wherein the intense heating source comprises an electron beam.

4. A method according to claim 1, wherein the intense heating source comprises a laser.

5. A method according to claim 1, wherein the substrate includes a transition layer adjacent the facing table and said cavities are formed in the face of the substrate transition layer which engages the rear face of the facing table.

6. A method according to claim 1, wherein the facing table includes a transition layer adjacent the substrate and said cavities are formed in the face of the substrate which engages the rear face of the transition layer.

7. A method according to claim 1, wherein at least some of said cavities are undercut whereby the facing table of superhard material becomes mechanically interlocked with the substrate.

* * * * *